United States Patent
Garland et al.

(10) Patent No.: US 6,799,487 B2
(45) Date of Patent: Oct. 5, 2004

(54) ANTI-LASH PEDAL BUSHING

(75) Inventors: Nathan L. Garland, Orion, MI (US); Andrew James Volker, Macomb, MI (US)

(73) Assignee: Teleflex Incorporation, Plymouth Meeting, PA (US)

( * ) Notice: Subject to any disclaimer, the term of this patent is extended or adjusted under 35 U.S.C. 154(b) by 153 days.

(21) Appl. No.: 10/170,788

(22) Filed: Jun. 12, 2002

(65) Prior Publication Data

US 2003/0230162 A1 Dec. 18, 2003

(51) Int. Cl.$^7$ ................................................. G05G 1/14
(52) U.S. Cl. .............................................. 74/512; 384/42
(58) Field of Search ...................... 74/512, 560; 384/29, 384/37, 38, 42

(56) References Cited

U.S. PATENT DOCUMENTS

| | | | |
|---|---|---|---|
| 1,555,214 A | * 9/1925 | Johnson ...................... | 384/297 |
| 2,312,822 A | * 3/1943 | Alexandre et al. .......... | 416/131 |
| 3,975,972 A | 8/1976 | Muhleck ...................... | 74/560 |
| 4,069,003 A | 1/1978 | Cecchi ........................ | 425/568 |
| 4,274,683 A | * 6/1981 | Gray et al. ................... | 384/106 |
| 4,497,399 A | 2/1985 | Kopich ........................ | 192/111 |
| 5,143,454 A | * 9/1992 | Morita ......................... | 384/37 |
| 5,722,300 A | * 3/1998 | Burkhard et al. ............. | 74/493 |
| 5,829,317 A | 11/1998 | Vreeken et al. ............... | 74/560 |
| 5,855,146 A | 1/1999 | Papenhagen et al. ......... | 74/560 |
| 5,890,399 A | 4/1999 | Rixon et al. .................. | 74/512 |
| 5,964,125 A | 10/1999 | Rixon et al. .................. | 74/514 |
| 6,089,484 A | 7/2000 | Zwayer et al. .............. | 242/321 |
| 6,295,890 B2 | 10/2001 | Rixon et al. .................. | 74/512 |
| 6,298,748 B1 | 10/2001 | Rixon et al. .................. | 74/512 |
| 6,698,309 B2 * | 3/2004 | Rixon et al. .................. | 74/512 |

OTHER PUBLICATIONS

Superguide Corp. v. DirectTV Enterprise 2004 WL 253013.

* cited by examiner

*Primary Examiner*—Chong H. Kim
(74) *Attorney, Agent, or Firm*—Howard & Howard (57) ABSTRACT

The adjustable pedal assembly (10) and (12) is characterized by a bushing (50) having a circumferentially flexible configuration for minimizing cocking movement of a pedal lever hub (36) relative to a guide rod. The bushing (50) includes peaks (56) and valleys (58) extending parallel to the bushing axis (B). The bushing (50) includes a pair of bearing straps (60,64) extending partially about the bushing (50) and have a radial thickness filling the radial distance between the peaks (56) and valleys (58). The bearing straps (60,64) are aligned to extend across the axis of the pedal lever (38) for reacting to loads placed on the hub (36) by the pedal lever (38). The bushing (50) includes a slit (62,66) extending circumferentially adjacent each of the straps (60,64) to allow the peaks (56) and valleys (58) to move circumferentially independently of the straps (60,64).

27 Claims, 7 Drawing Sheets

ANTI-LASH PEDAL BUSHING

BACKGROUND OF THE INVENTION

1. Field of the Invention

An adjustable pedal assembly of the type for adjusting the operating position of the brake, clutch and/or accelerator pedal in and automotive vehicle. More specifically, the invention relates to a bushing disposed between the hub of a pedal lever and a guide rod upon which the hub is axially movable to adjust the operating position of the pedal lever.

2. Description of the Prior Art

Adjustable pedal assemblies are well known that include a guide rod supported by a support that is mounted on a vehicle with a hub supported on the guide rod for rectilinear movement in fore and aft directions relative to and along the guide rod between various adjusted positions. A pedal lever extends downwardly from the hub to a distal pad end. A bushing is normally disposed between the guide rod and the hub. Such assemblies are shown in U.S. Pat. Nos. 5,890,399 and 5,964,125, both to Rixon et al.

Operating forces are applied to the pedal lever that tend to cock the hub relative to the guide rod and if the fit between the hub and guide rod is loose, an unacceptable lost motion occurs between the pedal lever and the guide rod.

SUMMARY OF THE INVENTION AND ADVANTAGES

A bushing for disposition between a guide rod and a hub of an adjustable pedal assembly and extending between a leading end and a trailing end in a cylindrical shape about a bushing axis and characterized by including a circumferentially flexible configuration about the bushing axis for minimizing cocking movement between the hub and the guide rod.

The subject invention provides a bushing between the hub and guide rod of an adjustable pedal assembly wherein the bushing accounts for tolerances, wear and the like to continually minimize the clearance between the hub and the guide rod to minimize lost motion between the hub and the guide rod in a plane containing the guide rod and the pedal lever extending form the hub.

Other advantages of the present invention will be readily appreciated as the same becomes better understood by reference to the following detailed description when considered in connection with the accompanying drawings wherein:

DETAILED DESCRIPTION OF THE PREFERRED EMBODIMENT

Figure 1:
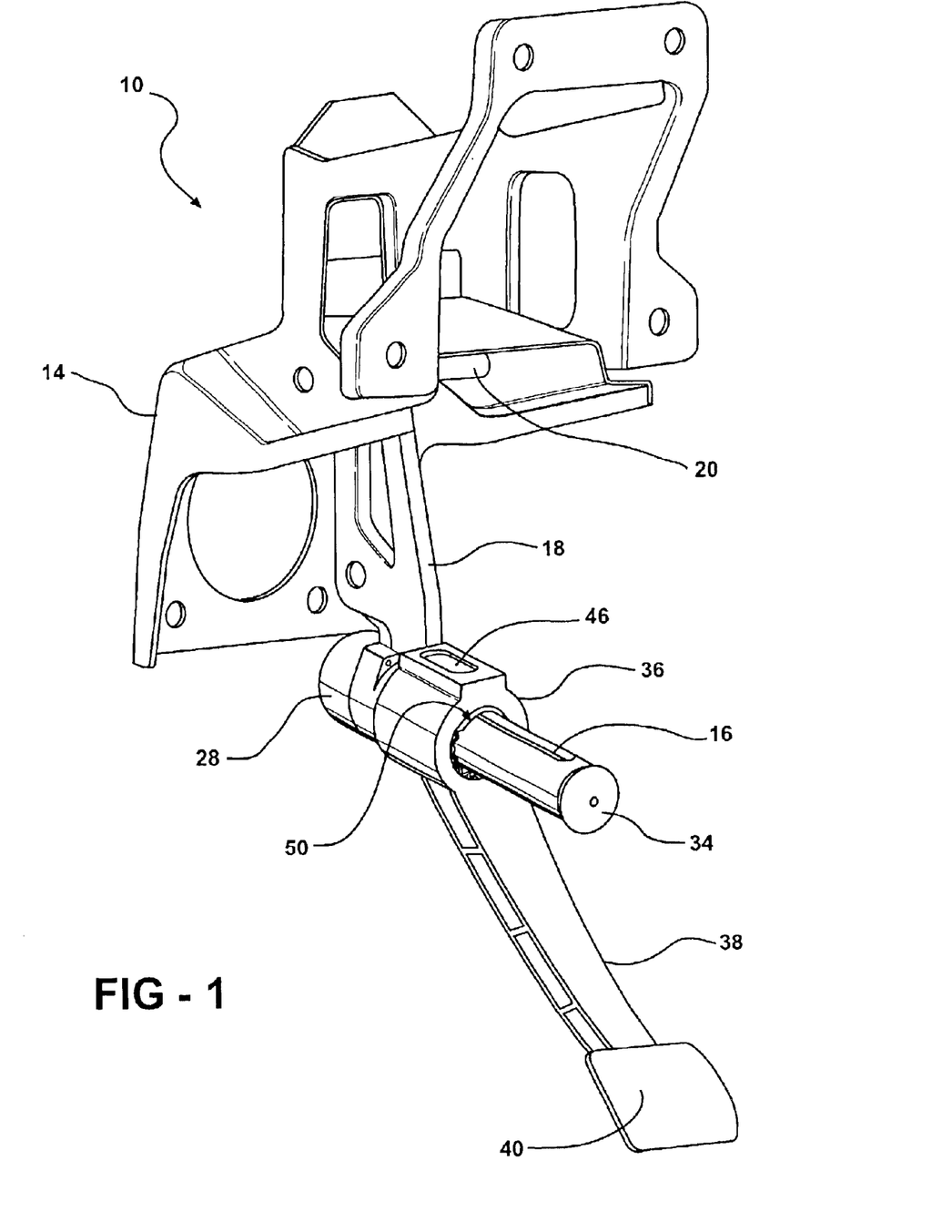
FIG. 1 is a perspective view of first embodiment of an adjustable pedal assembly employing the bushing of the subject invention.
Figure 2:
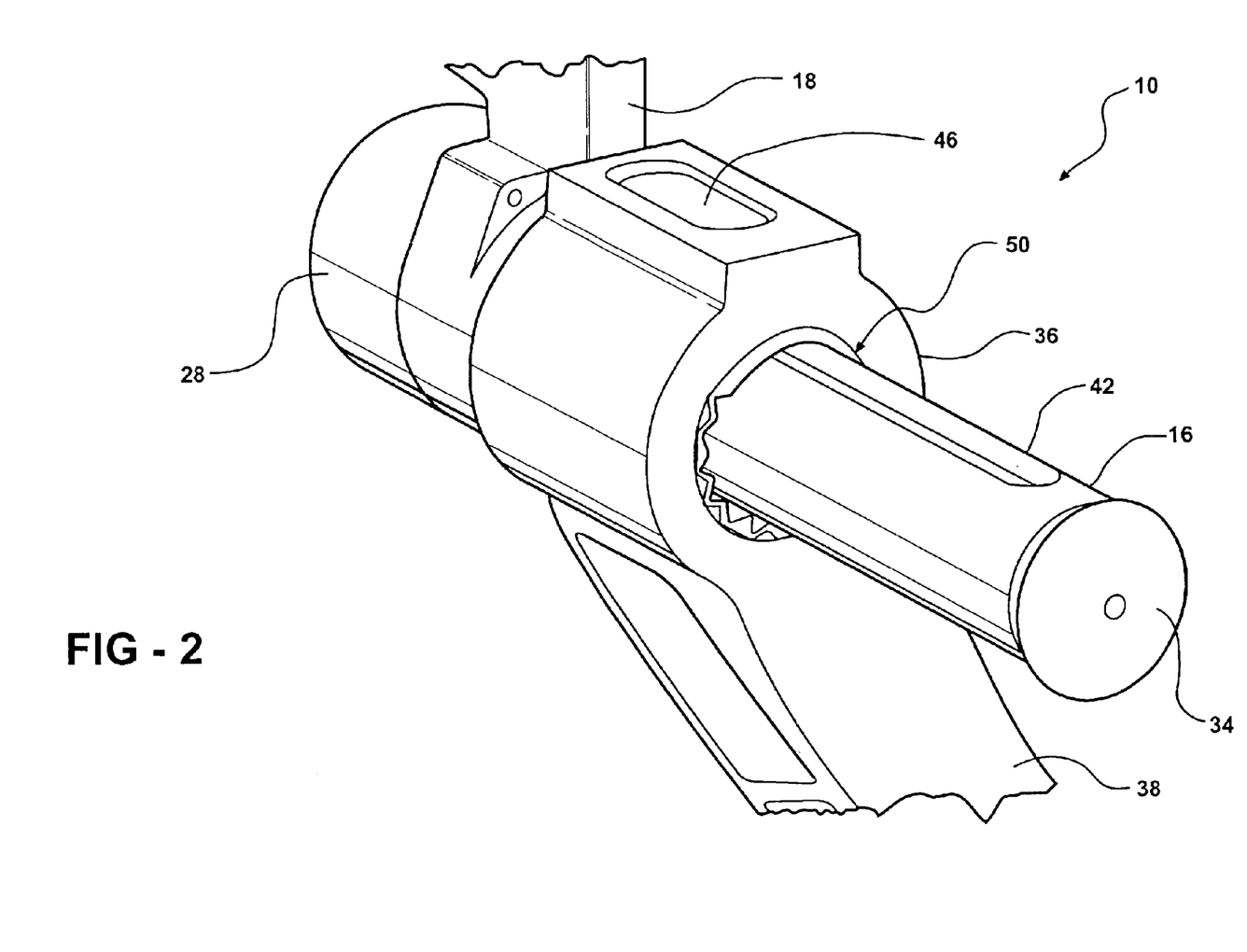
FIG. 2 is an enlarged perspective view showing the bushing of the subject invention disposed between the hub and guide rod of the embodiment of FIG. 1.
Figure 3:
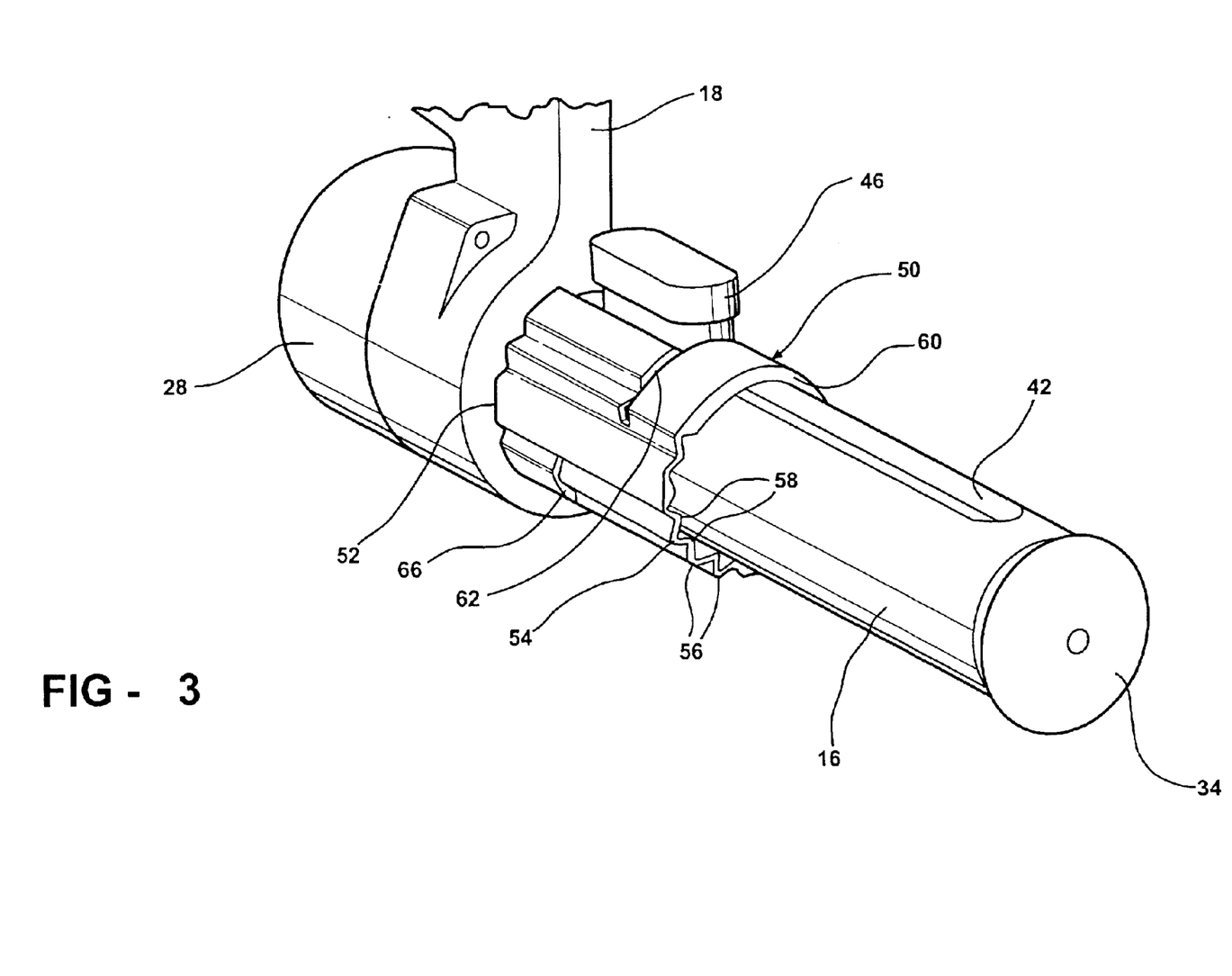
FIG. 3 is a perspective view like FIG. 2 but without the hub to expose the bushing of the subject invention.
Figure 4:
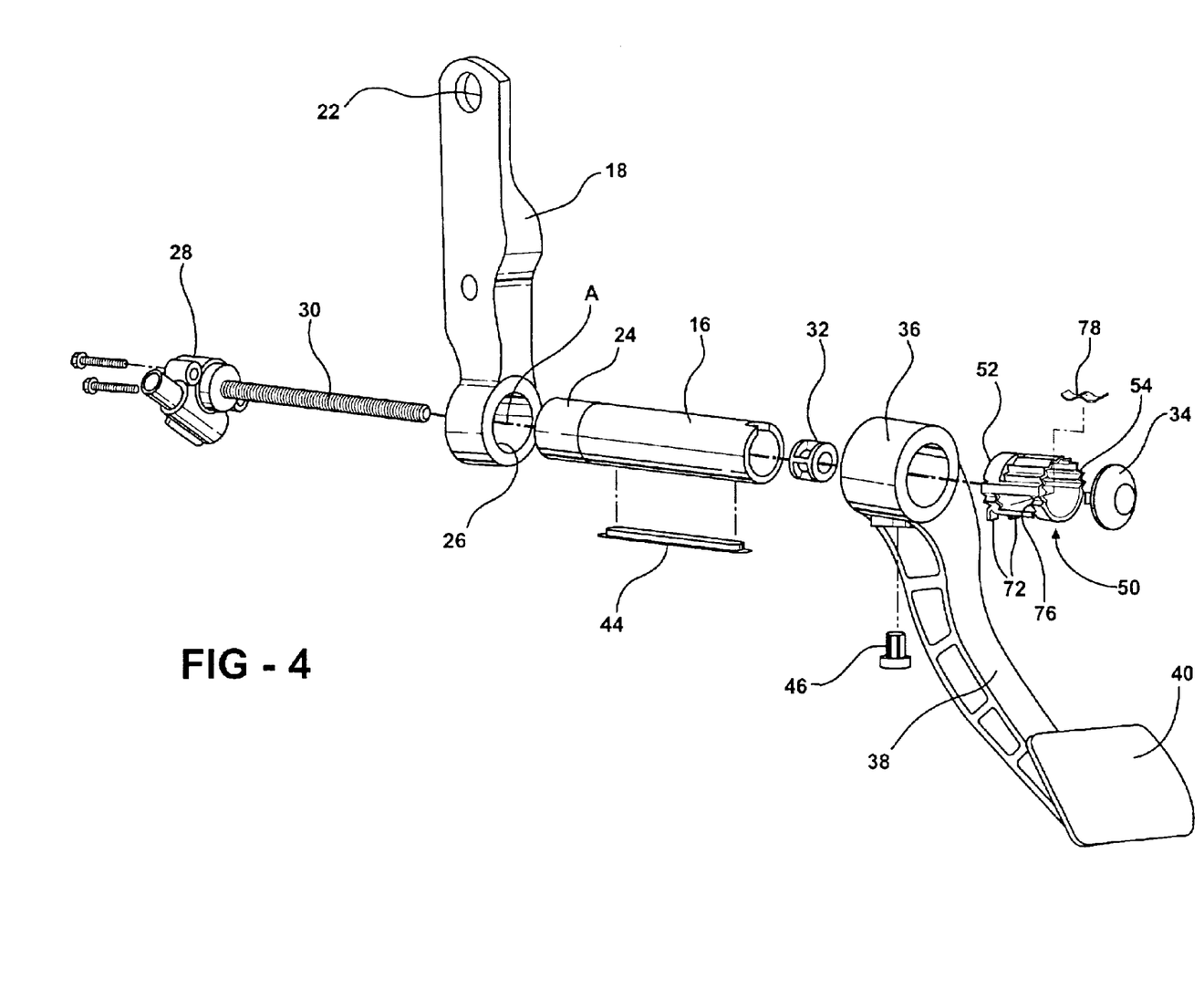
FIG. 4 is an exploded perspective view of a second embodiment of an adjustable pedal assembly employing the bushing of the subject invention.
Figure 5:
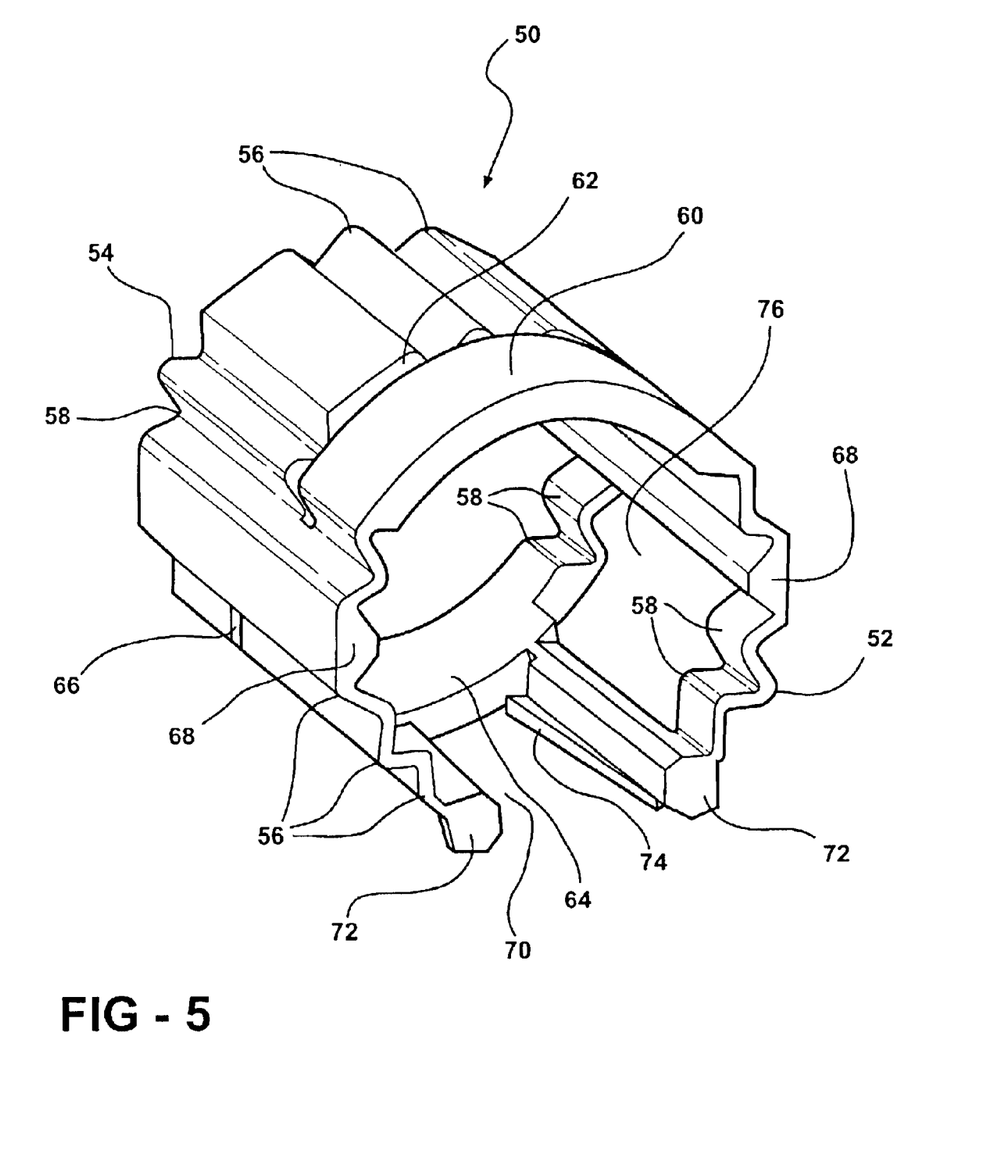
FIG. 5 is a perspective view of the bushing of the subject invention.
Figure 6:
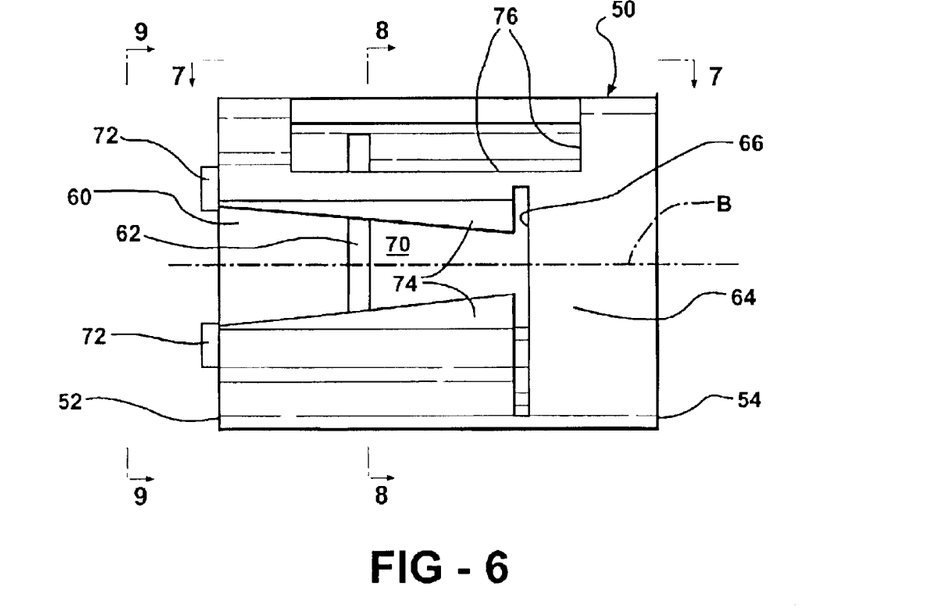
FIG. 6 is a bottom view taken from the bottom of FIG. 5.
Figure 7:
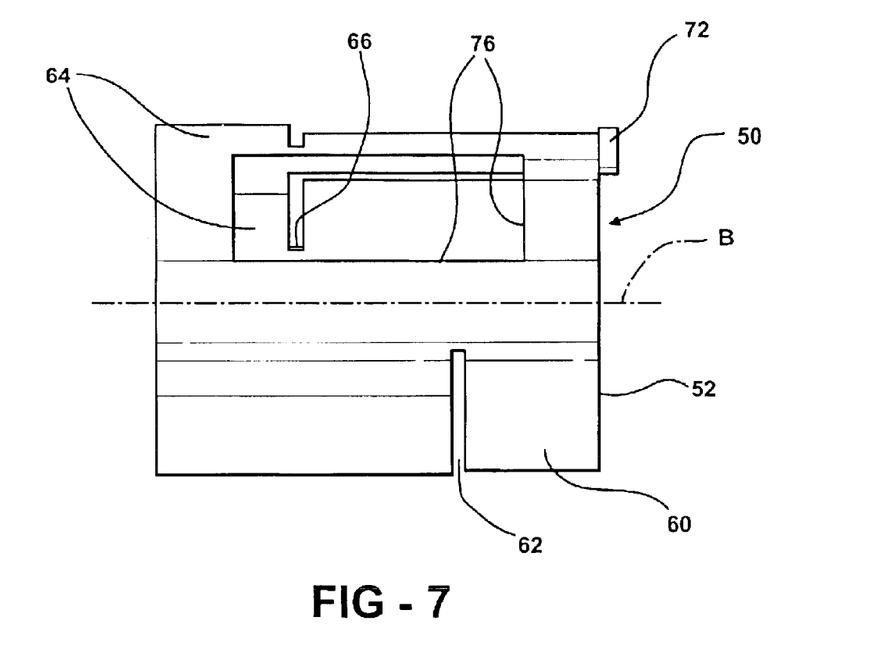
FIG. 7 is a side view taken along line 7—7 of FIG. 6.

Referring to the Figures, wherein like numerals indicate like or corresponding parts throughout the several views, a first embodiment of an adjustable pedal assembly utilizing the subject invention is generally shown at 10 in FIGS. 1–3 and a second embodiment is generally shown at 12 in FIG. 4.

As is well known in the art, each pedal assembly 10 and 12 includes a support 14 for mounting to a vehicle. A guide rod 16 is supported by the support 14 via a hanger lever 18, the hanger levers 18 being the same in the various Figures and only differing in shape. The hanger lever 18 is pivotally or rotatably supported by the support 14 by a shaft 20 that extends through a hole 22 in the upper end of the hanger lever 18. The guide rod 16 is cylindrical and extends about a longitudinal guide rod axis (A). The guide rod 16 has a reduced end 24 splined, press fit, or otherwise secured in a n opening 26 in the lower end of the hanger lever 18.

A well known drive mechanism is disposed in the guide rod 16 and includes a motor 28 attached to the lower end of the hanger lever 18 to rotate a screw 30 that extends through the guide rod 16. The screw 30 drives a nut 32 longitudinally along the interior of the guide rod 16. A cap 34 covers the open distal end of the guide rod 16.

A hub 36 encircles and is supported on the guide rod 16 for rectilinear movement in fore and aft directions relative to and along the guide rod axis (A) of the guide rod 16 between various adjusted positions. A pedal lever 38 extends from the hub 36 along a pedal lever 38 axis to a distal pad end that supports a pad 40. The guide rod 16 includes a guide rod opening 42 extending axially and may include a bearing member 44 (FIG. 4) inserted in the opening 42. A drive tongue 46 is connected to the hub 36 and extends radially through the guide rod opening 42 and into engagement with the nut 32. The tongue 46 moves longitudinally with the nut 32 upon rotation of the screw 30 by the motor 28 and as a result moves the hub 36 and depending pedal lever 38 to various adjusted positions along the guide rod 16. The tongue 46 in the embodiment of FIGS. 1–3 is inserted from the top of the hub 36 whereas the tongue 46 in the embodiment of FIG. 4 is inserted from the bottom of the hub 36.

A cylindrical bushing, generally indicated at 50, is disposed between the guide rod 16 and the hub 36 and extends between a leading end 52 and a trailing end 54 in a cylindrical shape about a bushing axis (B) that is parallel and concentric to the guide rod axis (A).

The adjustable pedal assembly 10 and 12 is characterized by the bushing 50 including a circumferentially flexible configuration about the bushing axis (B) for minimizing cocking movement of the hub 36 relative to the guide rod axis (A). The bushing 50 takes up tolerances or looseness between the guide rod 16 and the hub 36, i.e., an anti-lash bushing 50. The bushing 50 includes peaks 56 and valleys 58 extending parallel to the bushing axis (B) with the peaks 56 engaging the hub 36 and the valleys 58 engaging the guide rod 16. The peaks 56 and valleys 58 form corrugations that expand and contract circumferentially about the bushing 50 to maintain a tight fit between the hub 36 and the guide rod 16.

The bushing 50 includes a bearing strap 60 extending partially about the bushing 50 adjacent one end thereof, e.g., the leading end 52. The strap 60 has a radial thickness filling the radial distance between the peaks 56 and valleys 58. Said another way, the strap 60 presents a solid portion of the bushing 50 between the interior and the exterior thereof. The bearing strap 60 is aligned to extend across the axis of the pedal lever 38 for reacting to loads placed on the hub 36 by the pedal lever 38 tending to cock the hub 36 relative to the guide rod axis (A) in a vertical plane containing the axis (A) of the guide rod 16.

The bushing 50 includes a slit 62 extending circumferentially with the strap 60 to separate the strap 60 from the peaks 56 and valleys 58 adjacent thereto. The bushing 50 actually includes a pair of the bearing straps with the second bearing strap 64 disposed one hundred and eighty degrees from the first bearing strap 60 about the bushing 50 and with one strap 60 at the leading end 52 and one strap 64 at the trailing end 54. The bushing 50 includes a slit 62, 66 extending circumferentially adjacent each of the straps 60, 64 to separate the straps 60, 64 from the peaks 56 and valleys 58 adjacent thereto. The slits 62, 66 allow the peaks 56 and valleys 58 to move circumferentially independently of the straps 60, 64.

Figure 8:
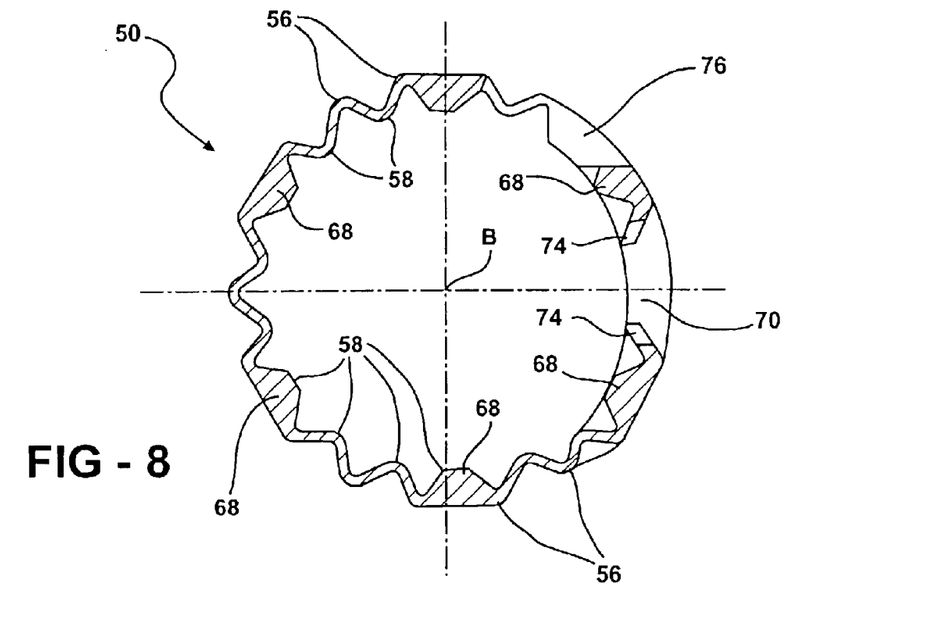
FIG. 8 is a cross sectional view taken along line 8—8 of FIG. 6.
Figure 9:
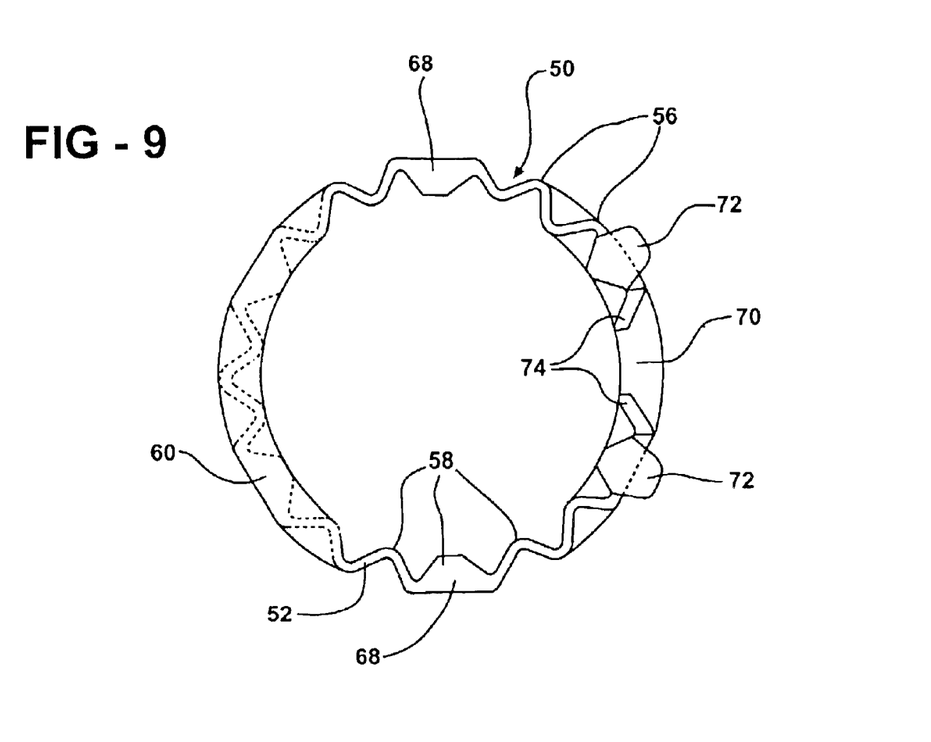
FIG. 9 is an end view taken along line 9—9 on the left end of FIG. 6.

The bushing 50 comprises an integral organic polymeric or plastic material and a plurality of the valleys 58 are filled valleys with the material as indicated at 68, see FIG. 8. These filled in valleys 68 give radial strength to the bushing 50 while the adjacent corrugations defined by the peaks 56 and valleys 58 allow circumferential expansion to maintain tight contact with both the hub 36 and guide rod 16. A first 62 of the slits terminates at a first end in a first valley and at a second end in a second valley and one of the filled valleys 68 is disposed next adjacent to each of the first and second valleys 58 where the slit 62 terminates. In addition, a pair of the filled valleys 68 is disposed between the ends of the first slit 62 and extend from the first slit 62 to the trailing end 54 of the bushing 50.

The bushing 50 also includes a slot 70 that opens into the leading end 52 of the bushing 50. A retaining tab 72 extends radially from the bushing 50 on each side of the slot 70 at the leading end 52 thereof. The tabs 72 radially overlap the hub 36 for retaining the bushing 50 in the hub 36. The slot 70 terminates in the second slit 66 with the second slit 66 extending circumferentially to either side of the second slit 66. Two V-shaped lips 74 are disposed along the edges of the slot 70 for allowing the tabs 72 to move radially inwardly during insertion of the bushing 50 into the hub 36 while allowing clearance for the tongue 46 to into the slot 70. The V-shaped lips prevent an interference when installing the bushing 50 into the hub 36 because the tabs 72 are squeezed together to narrow the slot 70 for the tabs 72 to clear the inside of the hub 36. This narrowing of the slot 70 brings the lips 74 together and they would interfere with the tongue 46 as the slot 70 moves past the tongue 46. When the bushing 50 is being inserted into the hub 36, the edges of the lips 74 are generally parallel and spaced apart the width of the tongue 46.

In addition, the bushing 50 includes an opening 76 and a spring 78 (FIG. 4) is disposed in the opening 76 for reacting radially between the hub 36 and the guide rod 16. The spring 78 prevents chatter between the hub 36 and the guide rod 16 by applying a slight loading on one side as the drive mechanism, which is disposed in the guide rod 16 and is connected to the tongue 46, moves the hub 36 axially along the guide rod 16.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An adjustable pedal assembly comprising;
a support (14) for mounting to a vehicle,
a guide rod (16) supported by said support (14) and having a longitudinal guide rod axis (A),
a hub (36) supported on said guide rod (16) for rectilinear movement in fore and aft directions relative to and along said guide rod axis (A) of said guide rod (16) between various adjusted positions,
a pedal lever (38) extending from said hub (36) along a pedal lever (38) axis to a distal pad end, and
a bushing (50) disposed between said guide rod (16) and said hub (36) and extending between a leading end (52) and a trailing end (54) in a cylindrical shape about a bushing axis (B) parallel to said guide rod axis (A),
said bushing (50) including a circumferentially flexible configuration about said bushing axis (B) for minimizing cocking movement of said hub (36) relative to said guide rod axis (A),
said bushing (50) including at least one of peaks and/or valleys (58) extending parallel to said bushing axis (B) and engaging one of said hub (36) and/or said guide rod (16),
a bearing strap (60 or 64) extending partially about said bushing (50) adjacent one end (52 or 54) thereof and having and radial thickness filling the radial distance between said hub (36) and said rod (16).

2. An assembly as set forth in claim 1 wherein said bearing strap (60, 64) is aligned to extend across said pedal axis for reacting to loads placed on said hub (36) by said pedal lever (38) tending to cock said hub (36) relative to said guide rod axis (A).

3. An assembly as set forth in claim 2 wherein said bushing (50) includes a slit (62 or 66) extending circumferentially with said strap (60 or 64) to separate said strap (60 or 64) from said peaks (56) and/or valleys (58) adjacent thereto.

4. An assembly as set forth in claim 2 wherein said bushing (50) includes a pair of said bearing straps (60, 64) disposed one hundred and eighty degrees from one another about said bushing (50) and with one strap (60) at said leading end (52) and one strap (64) at said trailing end (54).

5. An assembly as set forth in claim 4 wherein said bushing (50) includes a slit (62, 66) extending circumferentially adjacent each of said straps (60, 64) to separate said straps (60, 64) from said peaks (56) and/or valleys (58) adjacent thereto.

6. An assembly as set forth in claim 5 wherein said bushing (50) comprises an integral organic polymeric material and a plurality of said valleys (58) are filled valleys (68) with said material.

7. An assembly as set forth in claim 6 wherein a first (62) of said slits terminates at a first end in a first valley and at a second end in a second valley and one of said filled valleys (68) is disposed next adjacent to each of said first and second valleys (58).

8. An assembly as set forth in claim 7 including a pair of said filled valleys (68) disposed between said ends of said first slit (62).

9. An assembly as set forth in claim 8 wherein said bushing (50) includes a slot (70), and including a drive tongue (46) connected to said hub (36) and extending radially through said slot (70).

10. An assembly as set forth in claim 9 wherein said slot (70) opens into said leading end (52) of said bushing (50) and including a retaining tab (72) extending radially from said bushing (50) on each side of said slot (70) said leading end (52) thereof, said tabs (72) radially overlapping said hub (36) for retaining said bushing (50) in said hub (36).

11. An assembly as set forth in claim 10 wherein said slot (70) terminates in said second slit (66), said second slit (66) extending circumferentially to either side of said second slit (66).

12. An assembly as set forth in claim 11 including V-shaped lips (74) disposed along the edges of said slot (70) for allowing said tabs (72) to move radially inwardly during insertion of said bushing (50) into said hub (36) while allowing clearance for said tongue (46) to into said slot (70).

13. An assembly as set forth in claim 12 wherein said bushing (50) includes an opening (76) and including a spring (78) disposed in said opening (76) for reacting radially between said hub (36) and said guide rod (16).

14. An assembly as set forth in claim 13 including a drive mechanism disposed in said guide rod (16) and connected to said tongue (46) for moving said hub (36) axially along said guide rod (16).

15. An assembly as set forth in claim 1 wherein said bushing (50) comprises an integral organic polymeric material and a plurality of said valleys (58) are filled with said material.

16. A bushing for disposition between a guide rod (16) and a hub (36) and extending between a leading end (52) and trailing end (54) in a cylindrical shape about a bushing axis (B),
   a circumferentially flexible configuration about said bushing axis (B) for minimizing cocking movement between the hub (36) and the guide rod (16),
   said bushing (50) including at least one of peaks (56) and/or valleys (58) extending parallel to said bushing axis (B) and/or the guide rod (16),
   a bearing strap (60 or 64) extending partially about said bushing (50) adjacent one end (52 or 54) thereof and having a radial thickness filling the radial distance to said peaks (56) and/or valleys (58).

17. A bushing set forth in claim 16 wherein said bearing strap (60, 64) is aligned to extend across said pedal axis for reacting to loads placed on the hub (36) tending to cock the hub (36) relative to said bushing axis (B).

18. A bushing as set forth in claim 17 wherein said bushing (50) includes a slit (62, 66) extending circumferentially with said strap (60, 64) to separate said strap (60, 64) from said peaks (56) and/or valleys (58) adjacent thereto.

19. A bushing as set forth in claim 18 wherein said bushing (50) includes a pair of said bearing straps (60, 64) disposed one hundred and eighty degrees from one another about said bushing (50) and with one strap (60) at said leading end (52) and one strap (64) at said trailing end (54).

20. A bushing as set forth in claim 19 wherein said bushing (50) includes a slit (62, 66) extending circumferentially adjacent each of said straps (60, 64) to separate said straps (60, 64) from said peaks (56) and/or valleys (58) adjacent thereto.

21. A bushing as set forth in claim 20 wherein said bushing (50) comprises an integral organic polymeric material and a plurality of said valleys (58) are filled valleys (68) with said material.

22. A bushing as set forth in claim 21 wherein a first (62) of said slits terminates at a first end in a first valley and at a second end in a second valley and one of said filled valleys (68) is disposed next adjacent to each of said first and second valleys (58).

23. A bushing as set forth in claim 22 including a pair of said filled valleys (68) disposed between said ends of said first slit (62).

24. A bushing as set forth in claim 23 wherein said bushing (50) includes a slot (70) opening (76) into said leading end (52) of said bushing (50) and including a retaining tab (72) extending radially from said bushing (50) on each side of said slot (70) at said leading end (52) thereof whereby said tabs (72) radially overlap the hub (36) for retaining said bushing (50) in the hub (36).

25. A bushing as set forth in claim 24 wherein said slot (70) terminates in said second slit (66), said slit (66) extending circumferentially to either side of said second slit (66).

26. A bushing as set forth in claim 25 including V-shaped lips (74) disposed along the edges of said slot (70).

27. A bushing as set forth in claim 26 wherein said bushing (50) includes an opening (76).

* * * * *